United States Patent [19]

Anderson et al.

[11] 4,100,587
[45] Jul. 11, 1978

[54] CIRCUIT FOR DETECTING THE FLOW OF AN EXCESS OF REVERSE POWER FROM A LOAD TO A POWER SYSTEM

[75] Inventors: Thomas E. Anderson; Steven C. Peak, both of Normal; Ole N. Ibsen, Bloomington, all of Ill.

[73] Assignee: General Electric Company, New York, N.Y.

[21] Appl. No.: 755,102

[22] Filed: Dec. 28, 1976

[51] Int. Cl.² .............................................. H02H 3/42
[52] U.S. Cl. ......................................... 361/82; 361/84
[58] Field of Search ..................... 361/82, 84, 79, 76, 361/77; 307/232; 324/142

[56] References Cited

U.S. PATENT DOCUMENTS

| | | | |
|---|---|---|---|
| 3,532,935 | 10/1970 | Waldron | 361/82 X |
| 3,697,811 | 10/1972 | Little | 361/82 |
| 3,875,509 | 4/1975 | Milkovic | 324/142 |
| 3,921,070 | 9/1972 | Ringstad et al. | 324/142 |

*Primary Examiner*—Patrick R. Salce
*Attorney, Agent, or Firm*—S. A. Young; W. C. Bernkopf

[57] ABSTRACT

A circuit disposed between a power supply and a load for detecting the flow of an excess of power from the load back through the supply. The circuit is comprised of means for sensing the instantaneous current flowing between the power supply and the load, and means for sensing the instantaneous output voltage from the power supply. The circuit is further comprised of means responsive to the sensed instantaneous voltage and current for generating a signal that is indicative of instantaneous power flowing between the power supply and the load. Means is also provided for filtering out those components of the signal indicative of the instantaneous power which are at a frequency higher than the frequency of the AC current flowing between the power supply and the load to obtain a signal having a magnitude indicative of the average power flowing therebetween. Further provided is means responsive to the average power signal for generating a signal to cause the disconnection of the power supply from the load when the average power signal is of a magnitude and polarity which is indicative of an excess in reverse power flowing from the load to the power supply.

21 Claims, 4 Drawing Figures

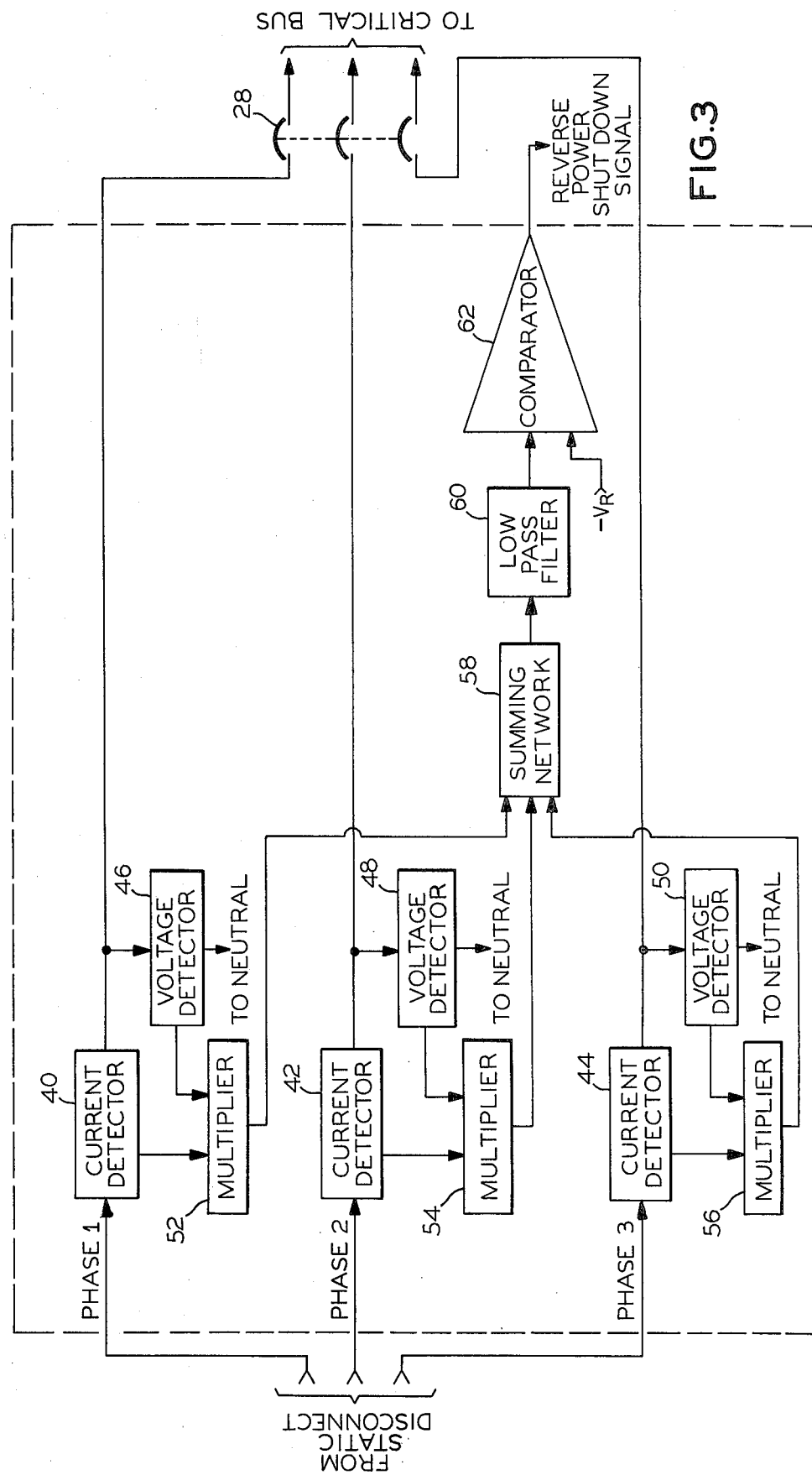

CIRCUIT FOR DETECTING THE FLOW OF AN EXCESS OF REVERSE POWER FROM A LOAD TO A POWER SYSTEM

BACKGROUND OF THE INVENTION

1. Field of the Invention

This invention relates to a circuit for detecting the flow of an excess of reverse power from a load to a power supply, such as an uninterruptible power system, to cause disconnection of the power supply from the load.

2. Description of the Prior Art

In reverse power detection systems of the type described in U.S. Pat. No. 3,539,868, reverse current is detected, by monitoring the phase of a corresponding voltage signal. Under these circumstances, it is assumed that reverse power is flowing, and if the current is above a designated threshold level, a detection signal will be generated. However, the actual magnitude of reverse power is never really detected. It is conceivable that when reverse current above a threshold value is detected, the magnitude of the corresponding voltage signal could be very small. Thus, while an acceptable small amount of reverse power may actually be flowing, if the detected reverse current is greater than a specified magnitude, a system will still be shut down. Inasmuch as this and other systems described in the prior art only provide a guess of the flow of reverse power, rather than providing an actual determination of the real magnitude of reverse power, there is no accurate way of determining when to disconnect a power system from its load if an excess of reverse power is actually flowing back from a load into a power system.

OBJECT OF THE INVENTION

It is therefore an object of this invention to provide a circuit for actually detecting an excess of reverse power that is flowing from a load back through a power system, and thereby cause disconnection of the power system from the load.

This and other objects of the invention will be pointed out hereinafter.

SUMMARY OF THE INVENTION

According to a broad aspect of the invention, there is provided a circuit for detecting the flow of an excess of reverse power from a load to a power supply. The circuit is comprised of means for sensing the instantaneous current flowing between the power supply and the load, and means for sensing the instantaneous output voltage from the power supply. The circuit further provides means responsive to the instantaneous voltage and current for generating a signal indicative of instantaneous power flowing between the power supply and the load.

When the power supply is a single phase power supply, the circuit provides means for filtering out those components of the signal indicative of the instantaneous power which are at a frequency higher than the frequency of the AC current flowing between the power supply and the load to obtain a signal having a magnitude indicative of the average power flowing between the power supply and the load, and having a polarity indicative of the direction of flow of the average power between the power supply and the load. Further provided is means responsive to the signal indicative of the average power for generating a signal to cause the disconnection of the power supply from the load when the average power signal is indicative of excess reverse power flowing from the load to the power supply.

When the power supply is a multi-phase power supply, the circuit provides means for summing the signal from each phase which is indicative of the instantaneous power. Further provided is means responsive to the summed signal for generating a signal to cause the disconnection of the power supply from the load when the summed signal is indicative of an average power signal that is further indicative of an excess of reverse power flowing from the load to the multi-phase power supply. The summed signal is indicative of the average power signal when the load is a balanced load. When the load is not a balanced load, a low pass filtering means must be interposed between the summing means and the means for generating a signal to cause the disconnection of the power supply. This low pass filtering means filters out those components of the signal indicative of the instantaneous power which are at least twice the frequency of the AC current flowing between the multi-phase power supply and the load to obtain a signal that has a magnitude that is indicative of the average power flowing between the power supply and the load.

BRIEF DESCRIPTION OF THE DRAWINGS

FIG. 3 is a block diagram of a circuit for detecting the flow of reverse power from a load back into a three-phase power system.

DESCRIPTION OF THE PREFERRED EMBODIMENTS

The invention will now be explained with reference to FIGS. 1 through 4.

Figure 1:
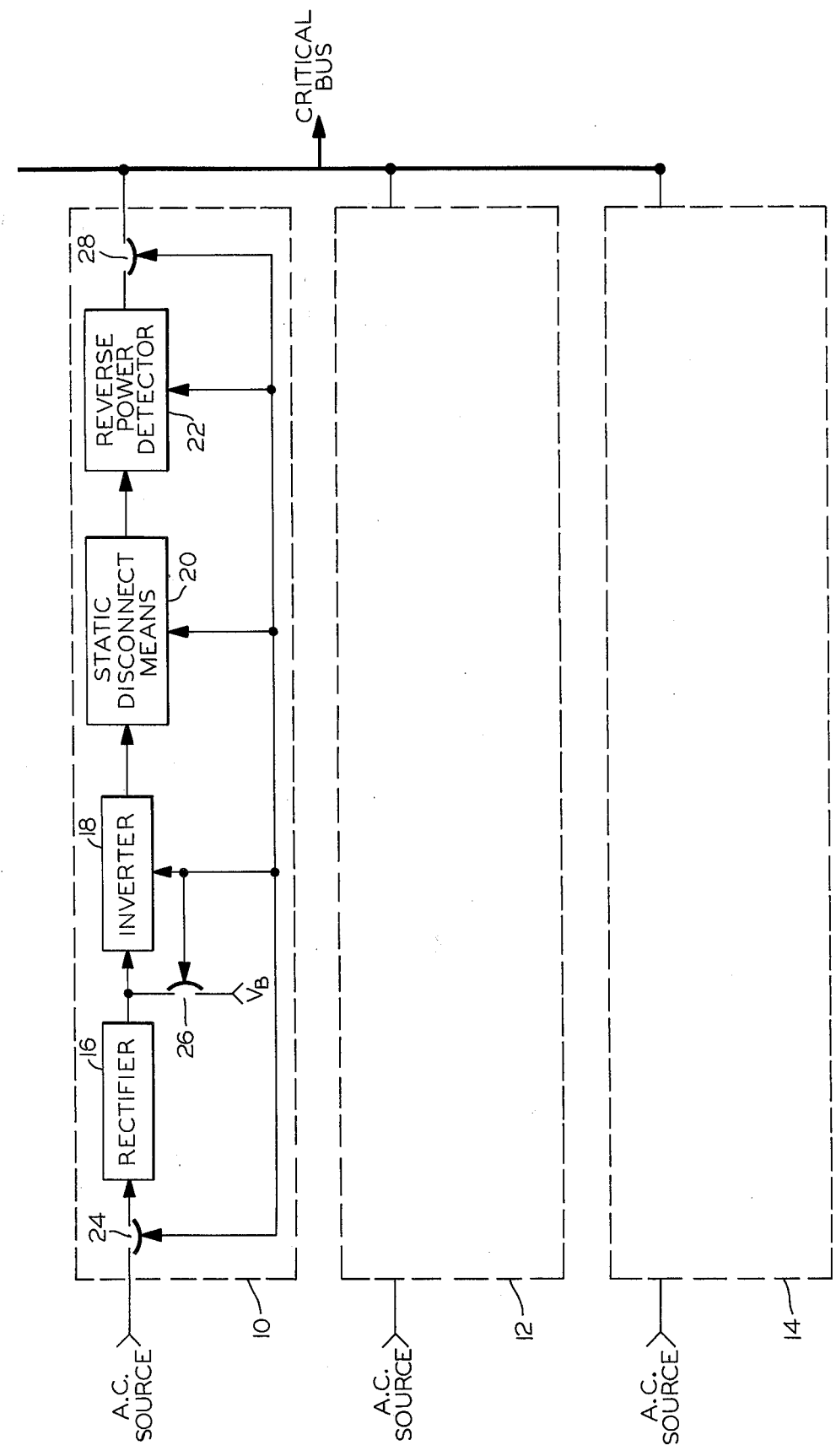
FIG. 1 is a block diagram of a plurality of uninterruptible power systems connected to a critical bus or load.

Referring to FIG. 1, there is shown a plurality of uninterruptible power systems (UPS) 10, 12 and 14 which are connected between an AC source of power and a critical bus to which a load, such as a computer, is connected. Inasmuch as the critical bus and load require a dependable AC power supply having a magnitude and frequency within very tightly specified limits, the UPS systems referred to above are interposed between the Ac source and the critical bus to satisfy these requirements.

Since the details of each UPS shown in FIG. 1 is the same, an explanation of the block diagram for UPS 10 will only be provided. UPS 10 is comprised of a rectifier 16, an inverter 18, a static disconnect means 20, a reverse power detector 22, an internal battery $V_B$ and circuit breakers 24, 26 and 28. The AC power source from a utility is connected to the input of rectifier 16 via a circuit breaker 24. The rectified output of rectifier 16 and the DC battery $V_B$ via circuit breaker 26 are electrically coupled to the input of inverter 18 via a DC link (not shown). Inverter 18 receives the DC power at its input and provides reliable AC power from its output, which AC power is delivered via static disconnect means 20, reverse power detector 22 and circuit breaker 28 to the critical load. Inverter 18 can be comprised of any standard inverter circuit of the type described in Reissue Pat. No. 26,342, and assigned to the same assignee as the assignee of the present invention, or any other known inverter means. Static disconnect means 20 can be provided by any standard static interruptor of the type described in U.S. Pat. No. 3,530,360, and also assigned to the same assignee as the assignee of the present invention. Reverse power detector 22 in accordance with the invention detects the flow of excess power from the critical bus back through the static disconnect means and the inverter, and generates a signal which can be used to trip circuit breakers 24, 26 and 28, and can also be used to shut down inverter 18 and trip static disconnect means 20, the result of which is disconnection of the UPS from the critical bus or load.

The reason that a plurality of UPS systems are connected to a critical load is that redundancy of units is often necessary in order to ensure that the critical load is never disturbed. In the event that one UPS system is operating in a faulty mode, and is actually receiving an excessive amount of power from the load, it would be necessary to remove that UPS from the critical bus as soon as possible. When using a plurality of redundant UPS systems to supply power to a critical bus, generally the systems will be rated in such a manner that there may be a variation of as much as, for example 10%, in power delivery capability between each unit. Under these circumstances, at low load or no-load conditions, a certain amount of current can flow from one UPS system to the other. This amount of reverse current and resulting reverse power is generally considered under these circumstances permissible and not excessive. Thus, the reverse power detector would be set and adjusted, as will be explained later, to detect an amount of reverse power in excess of the permissible amount in order to ensure that the UPS system will only be removed from the critical bus when there is truely an excessive amount of reverse power flowing. It should be understood, of course, that within the framework of this invention in non-redundant or even redundant UPS systems, there is the possibility that the amount of reverse power that is considered excessive would be any flow of reverse power greater than zero.

Figure 2:
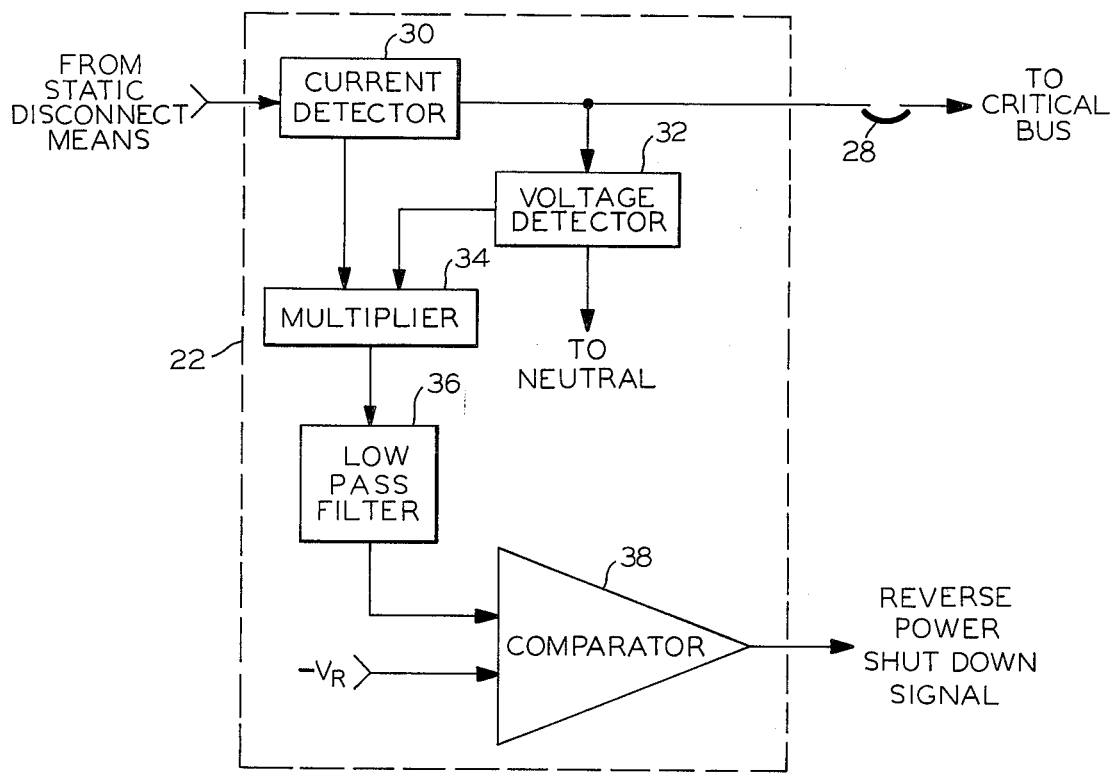
FIG. 2 is a block diagram of a circuit for detecting the flow of reverse power from a load back into a single phase power system.

Referring now to FIG. 2, reverse power detector 22 is comprised of a circuit disposed between inverter 18 and circuit breaker 28 (more specifically in this example, between static disconnect means 20 and circuit breaker 28) for detecting the flow of an excess of reverse power from the load to a single phase uninterruptible power system or, more specifically, inverter 18 and static disconnect means 20. The reverse power circuit includes a current detector 30, a voltage detector 32, a multiplier 34, a low pass filter 36 and a comparator 38. Current detector 30 can be any standard current sensing device such as a current transformer which senses the flow of current between the UPS and the critical load, and provides an instantaneous signal $I_a$ which is applied to one input of the multiplier 34. Voltage detector 32 can be any standard voltage sensing device such as a potential transformer connected between the output of the UPS and neutral which provides an instantaneous voltage $V_{an}$ from the output of the UPS, and applies its output signal to another input terminal of multiplier 34. Multiplier 34 can be a standard four quadrant analog multiplier, such as Model No. NC 1595L made by Motorola, which is responsive to the sensed instantaneous voltage and current, and generates therefrom an instantaneous power signal ($P_I$) which is indicative of the instantaneous power flowing between the UPS and the load. In this instance, the instantaneous power ($P_I$) is equal to:

$$P_I = V_M I_M/2 \,[\cos(\alpha-\beta) + \cos(2\omega t + \alpha + \beta)] \quad (1)$$

wherein $V_M$ and $I_M$ are equal to the peak sensed respective instantaneous voltage and current values at the output of UPS;

$\alpha$ and $\beta$ are the respective radian angles of displacement for the instantaneous voltage and current signals ($V_{an}$ and $I_a$) from a fixed reference; and $\omega$ is the radian frequency of the instantaneous current and voltage signals at the output of the UPS. Low pass filter 36 is a standard filter which is used to filter out at least those components of the generated instantaneous power signal which are at least at twice the radian frequency of the AC current that is flowing between the UPS and the load. Furthermore, the low pass filter could simply be designed to filter out all signals above the radian frequency of the AC current flowing between the UPS and the load, or even all component signals having a frequency greater than zero, although it might not be desirable to filter out any signal component at a frequency less than the above-referred to radian frequency. As derived from equation (1), the output of the low pass filter will thus be equal to:

$$V_M I_M/2 \cos(\alpha-\beta) \quad (2)$$

due to the fact that the frequency dependent components of equation (1) will be filtered out. Inasmuch as $\cos(\alpha-\beta)$ is merely another expression for power factor, it is clear that equation (2) is equal to the average power ($P_{AV}$) flowing between the UPS and the load, wherein this average power signal has a polarity which is indicative of the direction of flow of the average power between the UPS and the load. The average power signal derived from low pass filter 36 is applied to one input of comparator 38 wherein the other input to the comparator has a reference signal ($-V_R$) applied thereto. This reference signal is calibrated and adjusted to be indicative of the minimum amount of excess reverse power which may permissibly flow from the load to the UPS. As stated before, in a redundant UPS system, $-V_R$ could be equivalent to the difference in power delivery capability between various redundant UPS units, or alternatively, $-V_R$ could be equal to zero if it is determined that no reverse power can be tolerated. Comparator 38, which can be any standard component known in the art, will then generate a reverse power shutdown signal from its output when the average power signal applied to the input of the comparator is of the same polarity and at least the same magnitude as reference signal $-V_R$. As explained with regard to FIG. 1, the reverse power shutdown signal can be applied to the three circuit breakers associated with the UPS, the inverter and the static disconnect means for causing total shutdown of the UPS and its resultant disconnection from the critical bus.

Referring now to FIG. 3, there is shown a reverse power detector for use within a multi-phase, i.e. 3 phase, UPS, wherein phases 1, 2 and 3 include respective current detectors 40, 42 and 44, respective voltage detectors 46, 48 and 50, and respective multipliers 52, 54 and 56. In addition to this, the reverse power detector will also include a summing network 58, a low pass filter 60 and a comparator 62. The current detector, voltage detector and multiplier for each phase can be comprised of the same elements which operate in the same manner as described with reference to the embodiment shown in FIG. 2 to produce respective instantaneous power signals from the multipliers of each phase that are respectively electrically coupled to the input of summing network 58. In the event that the load supplied by the multi or 3-phase UPS is a balanced load, i.e. equal load for each phase, then the output from summing network 58 will be equal to the average power for the three phases flowing between the load and the UPS due to the fact that frequency dependent components of the instantaneous power signals for each phase which are applied to the summing network will cancel each other out. Thus, when the load for the multi-phase UPS is a balanced load, the output of the summing network is the 3 phase average power signal which can be applied directly to the input of comparator 62. If the 3 phase average power signal is of the same polarity as and of equal or greater magnitude than the $-V_R$ reference signal also applied to the input of the comparator, then the comparator will sense that an excess of reverse power is flowing from the load to the UPS, and again a reverse power shutdown signal will be generated, which signal will be used to disconnect the multi-phase UPS system from the load. However, as is often the case, if the load for the UPS is or could be an unbalanced load, then the 3 phase instantaneous power signal from the output of summing network 58 will have frequency dependent components, and low pass filter 60, which is of the same type that has been described in the embodiment of FIG. 2, must be interposed between the output of the summing network and the input of the comparator to filter out the frequency components from the 3 phase instantaneous power signal. The output signal from the low pass filter will then be equal to the 3 phase average power signal which will be applied to the input of comparator 62. Again, once this 3 phase average power signal is of a magnitude equal to or greater than and of the same polarity as the $-V_R$ reference signal applied to the other input of comparator 62, comparator 62 will generate a reverse power shutdown signal to cause the UPS to be disconnected from the load.

Figure 4:
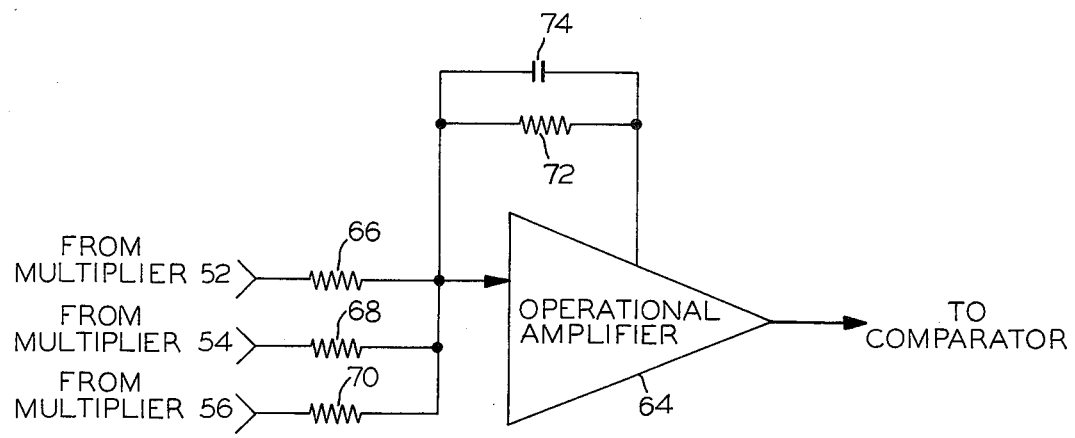
FIG. 4 is one embodiment of the summing network and low pass filter shown in FIG. 3.

As shown in FIG. 4, summing network 58 and low pass filter 60 can essentially be comprised of a standard operational amplifier 64, respective input resistors 66, 68 and 70, a feedback resistor 72 and a feedback capacitor 74. Resistors 66, 68 and 70 are respectively interposed between the input terminal of operational amplifier 64 and respective multipliers 52, 54 and 56 to form the equivalent of summing network 58, wherein the output of the operational amplifier will be applied to the input of comparator 62. Resistor 72 is a feedback resistor connected between an output of operational amplifier 64 and the input terminal of the operational amplifier, whereby the values of feedback resistor 72 and input resistors 66, 68 and 70 are selected in a manner to determine the gain of the operational amplifier 64. Feedback capacitor 74, which is connected across resistor 72, serves to convert the operational amplifier from a simple summing network to a summing network which also functions as a low pass filter, wherein the resistance of resistors 66, 68, 70 and 72 and the capacitance of capacitor 74 are selected to filter out all components of the summed instantaneous power signal which are at least at twice the previously referred to radian frequency of the instantaneous voltage and current signals at the output of the UPS, or which are above the radian frequency of the instantaneous voltage and current signals from the output of the UPS. Thus, the output signal from the operational amplifier is a 3 phase average power signal which has a magnitude equal to the flow of average power between the UPS and the load, and has a polarity which provides an indication of the direction of flow of the average power between the UPS and the load.

Thus, the embodiments shown in FIGS. 2–4 are examples of circuits which provide an actual indication of magnitude and direction of average power flowing between single or multi-phase UPS systems and a load so that it can be accurately determined when a power supply is clearly operating in a faulty mode, and is receiving an excess of reverse power from the load in order to cause the generation of a signal which can be used to quickly isolate the faulty UPS from the load.

Although this invention has been described with reference to specific embodiments thereof, numerous modifications are possible without departing from the invention, and it is desirable to cover all modifications falling within the spirit and scope of this invention.

What we claim as new and desire to secure by Letters Patent of the United States is:

1. In a multi-phase uninterruptible power system including a rectifier connected to an AC source, a battery, and an inverter connected to said rectifier and said battery for delivering multi-phase AC power to a critical load, a circuit disposed between said inverter and the critical load for detecting the flow of an excess of reverse power from the load to said uninterruptible power system is comprised of:
  (a) means within each phase for generating a signal indicative of the instantaneous current flowing within each said phase between said uninterruptible power system and the load;
  (b) means within each phase for generating a signal indicative of the instantaneous output voltage for each said phase of said uninterruptible power system;
  (c) means for multiplying the signal indicative of the instantaneous voltage by the signal indicative of the instantaneous current in each said phase to generate a signal indicative of the instantaneous power flowing within each said phase between said uninterruptible power system and the load;
  (d) means for summing each signal indicative of the instantaneous power for its respective phase; and
  (e) means, responsive to the summed signal, for generating a signal to cause the disconnection of said uninterruptible power system from the load when an excess of reverse power is flowing from the load to said uninterruptible power system.

2. In a multi-phase uninterruptible power system according to claim 1, wherein when the load is a balanced load, the summed signal provides an indication of the flow average power between said uninterruptible power system and the load, and is directly connected to said means for generating a signal to cause the disconnection of said uninterruptible power system from the load when the summed signal is of a magnitude and polarity indicative of an excess of reverse power flowing from the load to said uninterruptible power supply.

3. In a multi-phase uninterruptible power system according to claim 1, wherein when the load is an unbalanced load, said power system further comprises means for filtering out those components of the summed signal which are at least twice the frequency of the AC current flowing between said uninterruptible power system and the load to obtain a signal having a magnitude indicative of the average power flowing between said uninterruptible power system and the load, and having a polarity indicative of the direction of the flow of the average power between said uninterruptible power system and the load.

4. In a multi-phase uninterruptible power system according to claim 3, said filtering means is disposed between said summing means and said means for generating a signal to cause the disconnection of said uninterruptible power system from the load.

5. In a multi-phase uninterruptible power system according to claim 3, said filtering means eliminates all those components of the summed signal which are at a frequency higher than the frequency of the AC current flowing between said uninterruptible power system and the load.

6. In a multi-phase uninterruptible power system according to claim 3, said means for generating a signal to cause the disconnection of said uninterruptible power system from the load is further responsive to a reference signal that is indicative of the minimum amount of excess reverse power which may flow from the load to said uninterruptible power system, whereby the generated signal to cause the disconnection of said uninterruptible power system from the load is generated when the average power signal is of the same polarity and at least the same magnitude as the reference signal.

7. In a multi-phase uninterruptible power system according to claim 1, said summing means is comprised of an operational amplifier.

8. In a multi-phase uninterruptible power system according to claim 7, said operational amplifier further includes a feedback capacitor for providing means for filtering out those components of the summed signal which are at a frequency higher than the frequency of the current flowing between said uninterruptible power system and the load.

9. In an uninterruptible power system including a rectifier connected to an AC source, a battery, and an inverter connected to said rectifier and said battery for delivering AC power to a critical load, a circuit disposed between said inverter and the critical load for detecting the flow of an excess of reverse power from the load to said uninterruptible power system is comprised of:

(a) means for generating a signal indicative of the instantaneous current flowing between said uninterruptible power system and the load;

(b) means for generating a signal indicative of the instantaneous output voltage from said uninterruptible power system;

(c) means for multiplying the signal indicative of the instantaneous voltage by the signal indicative of the instantaneous current to generate a signal indicative of instantaneous power flowing between said uninterruptible power system and the load;

(d) means for filtering out those components of the signal indicative of the instantaneous power which are at least at twice the frequency of the AC current flowing between said uninterruptible power system and the load to obtain a signal having a magnitude indicative of the average power flowing between said uninterruptible power system and the load and having a polarity indicative of the direction of flow of the average power between said uninterruptible power system and the load; and (e) means, responsive to the signal indicative of the average power, for generating a signal to cause the disconnection of said uninterruptible power system from the load when the average power signal is indicative of an excess of reverse power flowing from the load to said uninterruptible power system.

10. In an uninterruptible power system according to claim 9, wherein said filtering means eliminates all those components of the signal indicative of the instantaneous power which are at a frequency higher than the frequency of the AC current flowing between said uninterruptible power system and the load.

11. In an uninterruptible power system according to claim 9, said means for generating a signal to cause the disconnection of said uninterruptible power system from the load is further responsive to a reference signal that is indicative of the minimum amount of excess reverse power which may flow from the load to said uninterruptible power system, whereby the generated signal to cause the disconnection of said uninterruptible power system from the load is generated when the average power signal is of the same polarity and at least the same magnitude as the reference signal.

12. An apparatus comprising a plurality of uninterruptible power systems, each of said uninterruptible power systems including a rectifier connected to an AC source, a battery, an inverter connected to said rectifier and said battery for delivering AC power to a critical load, and a circuit disposed between said inverter and the critical load for detecting the flow of an excess of reverse power from the load to said uninterruptible power system, said circuit comprising:

(a) means for generating a signal indicative of the instantaneous current flowing between said uninterruptible power system and the load;

(b) means for generating a signal indicative of the instantaneous output voltage from said uninterruptible power system;

(c) means for multiplying the signal indicative of the instantaneous voltage by the signal indicative of the instantaneous current to generate a signal indicative of instantaneous power flowing between said uninterruptible power system and the load;

(d) means for filtering out those components of the signal indicative of the instantaneous power which are at least at twice the frequency of the AC current flowing between said uninterruptible power system and the load to obtain a signal having a magnitude indicative of the average power flowing between said uninterruptible power system and the load, and having a polarity indicative of the direction of flow of the average power between said uninterruptible power system and the load; and (e) means, responsive to the signal indicative of the average power and to a reference signal indicative of the minimum amount of excess reverse power which may flow from the load to said uninterruptible power system, for generating a signal to cause the disconnection of said uninterruptible power system from the load when the average power signal is of the same polarity and at least the same magnitude as the reference signal.

13. A circuit, disposed between a multi-phase AC power supply and a load, for detecting the flow of an excess of reverse power from the load to the power supply comprising:

(a) means within each phase of the power supply for generating a signal indicative of the instantaneous current flowing within each said phase between the power supply and the load;
(b) means within each phase of the power supply for generating a signal indicative of the instantaneous output voltage for each said phase of the power supply;
(c) means for multiplying the signal indicative of the instantaneous voltage by the signal indicative of the instantaneous current in each said phase to generate a signal indicative of instantaneous power flowing within each said phase between the power supply and the load;
(d) means for summing each signal indicative of the instantaneous power for its respective phase; and
(e) means, responsive to the summed signal, for generating a signal to cause the disconnection of the power supply from the load when an excess of reverse power is flowing from the load to the power supply.

14. A circuit according to claim 13, wherein when the load is a balanced load, the summed signal is indicative of the flow of average power between the power supply and the load, and the summed signal is directly connected to said means for generating a signal to cause the disconnection of said uninterruptible power system from the load when the summed signal is of a magnitude and polarity indicative of an excess of reverse power flowing between the load and the power supply.

15. A circuit according to claim 13, wherein when the load is an unbalanced load, the circuit further comprises means for filtering out those components of the summed signal which are at least twice the frequency of the AC current flowing between the power supply and the load to obtain a signal having a magnitude indicative of the average power flowing between the power supply and the load, and having a polarity indicative of the direction of the flow of the average power between the power supply and the load.

16. A circuit according to claim 15, wherein said filtering means is disposed between said summing means and said means for generating a signal to cause the disconnection of the power supply from the load.

17. A circuit according to claim 15, wherein said filtering means eliminates all those components of the summed signal which are at a frequency higher than the frequency of the AC current flowing between the power supply and the load.

18. A circuit according to claim 15, wherein said means for generating a signal to cause the disconnection of the power supply from the load is further responsive to a reference signal that is indicative of the minimum amount of excess reverse power which may flow from the load to the power supply, whereby the generated signal to cause the disconnection of the power supply from the load is generated when the average power signal is of the same polarity and at least the same magnitude as the reference signal.

19. A circuit disposed between an AC power supply and a load for detecting the flow of an excess of reverse power from the load to the power supply comprising:
(a) means for generating a signal indicative of the instantaneous current flowing between the power supply and the load;
(b) means for generating a signal indicative of the instantaneous output voltage from the power supply;
(c) means for multiplying the signal indicative of the instantaneous voltage by the signal indicative of the instantaneous current to generate a signal indicative of instantaneous power flowing between the power supply and the load;
(d) means for filtering out those components of the signal indicative of the instantaneous power which are at least at twice the frequency of the AC current flowing between the power supply and the load to obtain a signal having a magnitude indicative of the average power flowing between the power supply and the load, and having a polarity indicative of the direction of flow of the average power between the power supply and the load; and
(e) means, responsive to the signal indicative of the average power, for generating a signal to cause the disconnection of the power supply from the load when the average power signal is indicative of an excess of reverse power flowing from the load to the power supply.

20. A circuit according to claim 19, wherein said filtering means eliminates all those components of the signal indicative of the instantaneous power which are at a frequency higher than the frequency of the AC current flowing between the power supply and the load.

21. A circuit according to claim 19, wherein said means for generating a signal to cause the disconnection of the power supply from the load is further responsive to a reference signal that is indicative of the minimum amount of excess reverse power which may flow from the load to the power supply, whereby the generated signal to cause the disconnection of said uninterruptible power system from the load is generated when the average power signal is of the same polarity and at least the same magnitude as the reference signal.

* * * * *